M. BOURKE.
Nut-Locks.
No. 197,087.  Patented Nov. 13, 1877.
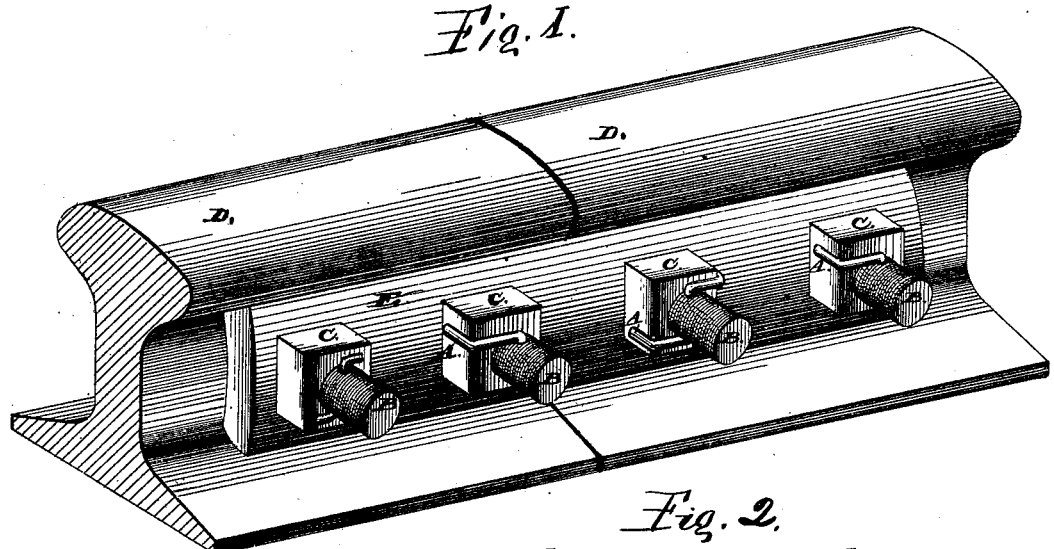
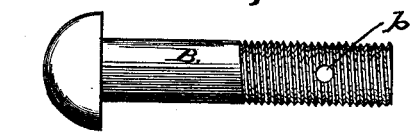
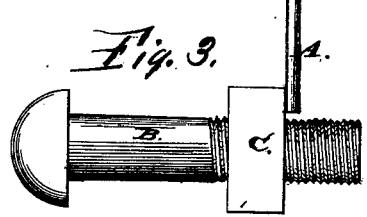
Attest:
Frank Jacobs
Lumar Jackson
Inventor:
Marten Bourke

UNITED STATES PATENT OFFICE.

MARTIN BOURKE, OF YOUNGSTOWN, OHIO, ASSIGNOR OF ONE-HALF HIS RIGHT TO DAVID M. WILSON, OF SAME PLACE.

IMPROVEMENT IN NUT-LOCKS.

Specification forming part of Letters Patent No. 197,087, dated November 13, 1877; application filed March 6, 1877.

*To all whom it may concern:*

Be it known that I, MARTIN BOURKE, of Youngstown, in the county of Mahoning and State of Ohio, have invented a new, useful, and improved mode of fastening and securing nuts or burrs upon bolts, for purposes of fastening railroad-rails together, and for fastening or securing bolts in any machinery or apparatus; and I do hereby declare that the following is a full and exact description.

The nature of my invention consists in inserting a copper wire, or a wire of any metal which will not corrode or rust, through a hole drilled through the bolt outside of the nut or burr, and, after being thus inserted or passed through the bolt, bend each end of the wire in different directions until it assumes about the shape of the letter Z, and, if necessary, bend over the nut or burr.

In the drawings, Figure 1 represents a fish-plate joint with my nut-lock; Fig. 2, bolt with drilled hole; Fig. 3, the key in position to be inserted. Fig. 4 represents the key as bent when applied.

The wire is represented in the accompanying drawing by letter A, and also as inserted through the bolt. B represents the bolt, having a hole drilled through its shank; C, the nut or burr; D, the railroad-rail; E E, the fish-plates.

I suggest that rubber washers or washers of porous substance be placed inside of the nut or burr to avoid any strain on the bolt in frosty weather.

Having inserted the bolt-shank through the holes in the parts to be united, and screwed on the nut in the usual manner, if the bolt has not already been drilled, I then drill a hole transversely through the shank of the bolt adjacent or near to the outer face of the nut. I then pass a wire rod, or any key which is circular in cross-section, into the hole, and bend its ends at an angle to the portion passing through the hole in the bolts in opposite directions, and along or near to the face of the nut. I may then bend one end of the circular key against the one side of the nut, or may bend each end of the wire against a side of the nut. The ends of the key, being bent in opposite directions, as described, prevent the key from turning in the hole, and present a stronger resistance to the nut when inclined to push against the key. Further resistance to tension of the nut is afforded by bending one or both of the ends of the key against the side or sides of the nut. When so bent they resist a torsional, as well as backward, movement of the nut.

The peculiar use and benefit of this invention consists in its preventing the constant jar of the cars or machinery from loosening the nut or burr.

The bolts can be manufactured with the hole drilled through them, or can be readily drilled after being placed through the rails and fish-plates, and so with regard to bolts in other machinery or apparatus.

The great difficulty in fastening by the mere threading of the bolt and nut or burr is the constant tendency to become loosened by jarring, which is entirely obviated by this invention, and renders a railroad-track and all machinery safer and more durable.

I am aware that oblong slots have been made through bolts, and taper and other keys have been passed through the bolt to keep the nut from turning back, and that one or both ends of the keys have been bent aside to keep the key in place. This oblong or square slot weakens the bolt more than a circular hole in it, and is more expensive to make than it is to drill a hole in a bolt. Moreover, the keys heretofore used are more expensive and complicated than my plain circular rod or wire.

I am also aware that a hole has been drilled through the shank of the bolt, and one or more grooves have been cut across the outer face of the nut, and a key has been placed through the hole in the bolt and lying in the groove in the nut; but in that case there is a special kind of groove to be cut in the nut, and special means for holding the key in place. These constructions I do not claim, they being more costly and complex than my nut-lock; but What I do claim is—

1. The combination of a bolt having a circular aperture transversely through its shank, a nut, and a key circular in cross-section passing through the bolt, and having its ends bent in opposite directions outside of the face of the nut, as and for the purpose set forth.

2. The combination of a bolt having a transverse circular aperture through its shank, a nut, and a key circular in cross-section passing through the bolt, and having its ends bent in opposite directions outside of the face of the nut, one or both ends of the key being bent against a side of the nut, as and for the purpose set forth.

MARTIN BOURKE.

Witnesses:
  FRANK JACOBS,
  LAMAR JACKSON.